United States Patent [19]

Kakii et al.

[11] Patent Number: 4,526,732
[45] Date of Patent: Jul. 2, 1985

[54] METHOD OF HEATING THERMAL SHRINKAGE TUBE AND APPARATUS THEREFOR

[75] Inventors: Toshiaki Kakii; Yuichi Toda; Koichiro Matsuno; Yuichi Usui, all of Kanagawa; Michito Matsumoto, Ibaraki, all of Japan

[73] Assignees: Nippon Telegraph & Telephone Public Corporation; Sumitomo Electric Industries Ltd., both of Japan

[21] Appl. No.: 500,671

[22] Filed: Jun. 3, 1983

[30] Foreign Application Priority Data

Jun. 4, 1982 [JP] Japan .................................. 57-95863

[51] Int. Cl.³ .............................................. B29C 27/20
[52] U.S. Cl. ...................................... 264/2.7; 264/1.5; 264/25; 264/230; 264/327; 264/DIG. 46; 425/143; 425/174.4
[58] Field of Search .................... 264/230, 327, 25–27, 264/DIG. 45, DIG. 46, 1.5, 1.4, 2.7; 425/174.4, 174.6, 143

[56] References Cited

U.S. PATENT DOCUMENTS

| | | | |
|---|---|---|---|
| 2,452,197 | 10/1948 | Kennedy | 264/DIG. 46 |
| 2,695,853 | 11/1954 | Foreit | 264/27 |
| 3,423,500 | 1/1969 | Gregory | 264/327 |
| 3,470,046 | 9/1969 | Verdin | 264/230 |
| 3,761,550 | 9/1975 | Seefluth | 264/25 |
| 4,019,241 | 4/1977 | Logan | 264/230 |
| 4,129,932 | 12/1978 | Stancati | 264/230 |
| 4,198,119 | 4/1980 | Uberbacher | 264/1.5 |
| 4,220,619 | 9/1980 | Kersten | 264/230 |
| 4,269,640 | 5/1981 | Frosch et al. | 264/230 |
| 4,289,721 | 9/1981 | Ishise | 264/230 |

FOREIGN PATENT DOCUMENTS 2414077 10/1975 Fed. Rep. of Germany ...... 264/230

Primary Examiner—Jeffery Thurlow
Attorney, Agent, or Firm—Sughrue, Mion, Zinn, Macpeak, and Seas

[57] ABSTRACT

A heating apparatus for thermally shrinkable tubes and the like has a heating density gradient such that a higher temperature is imparted initially to a central portion of the heated tube, spreading gradually to the ends of the tube, to purge air bubbles to the outside of the tube while employing only one heating element.

10 Claims, 5 Drawing Figures

METHOD OF HEATING THERMAL SHRINKAGE TUBE AND APPARATUS THEREFOR

BACKGROUND OF THE INVENTION

The present invention relates to an improved method for heating a thermal shrinkage tube to effect shrinkage when the tube is applied to reinforce the splice portion between optical fibers or the like, and an improved device used for performing the method.

Conventionally, a plurality of heaters have been used for heating a thermal shrinkage tube so as to cause shrinkage in the tube, for example, so as to protect the splice portion between optical fibers.

In such a case, if air bubbles remain in the space between the fiber splice portions and the inner surface of the tube, the optical transmission loss due to the splice portion becomes large. Therefore, it is necessary to make the inner surface of the tube adhere closely to the splice portion so as to completely purge the air bubbles. To this end, after the splice portion has been covered by a thermal shrinkage tube, the tube is first heated so as to increase the temperature at the central portion thereof to thereby cause the inner surface of the tube to adhere closely to the splice portion to provide thereat a state including no air bubbles and then the heat is successively progressively applied to the opposite ends of the tube to thereby remove air bubbles therefrom.

In the case where, for example, wire heaters are used as the heating means for performing the above-described method, a method has been conventionally used in which three wire heaters are longitudinally separately provided along the thermal shrinkage tube covering the splice portion, so that the central wire heater is first energized to thereby cause the tube to shrink at its central portion to closely adhere to the splice portion to remove air bubbles therefrom, and then the shrinkage is made to successively progress from the central portion to the opposite ends of the tube by a time-difference heating system to thereby cause the tube to entirely closely adhere to the splice portion with no air bubbles remaining inside the tube. In the conventional method, however, it is necessary to provide not only three separate wire heaters, but also three temperature rise control devices such as thermistors, so that various disadvantages arise in that the control circuit becomes complex, thereby requiring additional component parts and resulting in an increased cost in performing the method and in providing the device for achieving the method.

SUMMARY OF THE INVENTION

An object of the present invention is to provide a novel method and a novel device for heating a thermal shrinkage tube, in which the above-mentioned disadvantages are abated, and in which ideal thermal shrinkage is imparted to the tube to thereby substantially completely protect an optical fiber splice portion, by using a single heating wire and a control device therefor. That is, according to the present invention, a heater having a temperature distribution formed longitudinally with respect to the thermal shrinkage tube is used. Particularly, the pitch or density of a heating wire in the form of a helical or bent shape of a linear heating device is varied along the longitudinal direction of an object to be heated so as to provide a temperature distribution. That is, with respect to the heating wire, the pitch is small or the density is large at its central portion, while the pitch is large or the density is small at its opposite end portions, so that the central portion of the tube is first strongly heated and the strong heating successively progresses to the opposite end portions, whereby the central portion of the thermal shrinkage tube is shrunk first to cause the inner surface of the tube to adhere closely to the splice portion of optical fibers to purge air bubbles toward the opposite end portions. The temperature rise progresses toward the opposite end portions of the thermal shrinkage tube with a certian time lag so that the closely adhering stage progressively advances from the central portion to the opposite end portions of the tube to thereby purge any air bubbles at the opposite end portions.

The term "linear heating device" as mentioned above is defined herein as a heat generating device in the form of an elongated line such as, typically, a heating wire formed into a helical, bent or saw-tooth shape, or an elongated tube through which super-heated stream, a high temperature gas, or a high temperature fluid of a low melting point metal is passed.

DETAILED DESCRIPTION OF THE PREFERRED EMBODIMENTS

Figure 1:
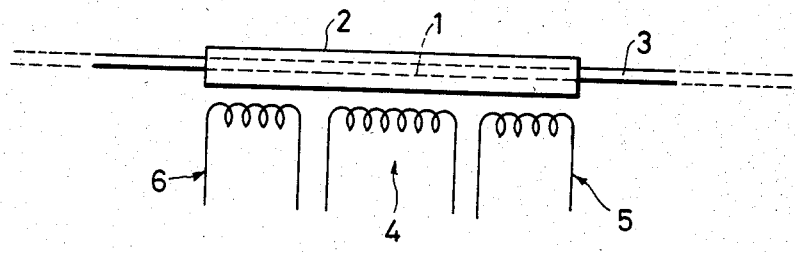
FIG. 1 is a side view of a conventional device for heating a thermal shrinkage tube used for the reinforcement of the splice portion between optical fibers.

An embodiment of the present invention will now be described by way of an example used in the protection of optical fiber splices. For the purpose of comparison, an example of the prior art is first shown in FIG. 1, which is a side view in which an optical fiber junction portion 1 is covered by a thermal shrinkage tube 2. The reference numeral 3 denotes optical fibers, the dotted line portions thereof being a portion covered with the tube and outwardly extending portions. In this device, a heating device constituted by three separate heating wires, 4, 5 and 6 is provided along the longitudinal direction of the thermal shrinkage tube 2, and the central heating wire 4 is first energized to cause the central portion of the thermal shrinkage tube 2 to shrink to adhere closely to the optical fiber splice portion 1. Then, the side heating wires 5 and 6 are energized to cause thermal shrinkage to progress, by way of a so-called time-difference heating system due to a time lag in the energization between the central heating wire and the side heating wires, without leaving air bubbles between the inner surface of the thermal shrinkage tube and the optical fibers. In the conventional device, however, there are various disadvantages such as an increase in the number of parts constituting the device, a complication in the structure of the device, etc.

Figure 2:
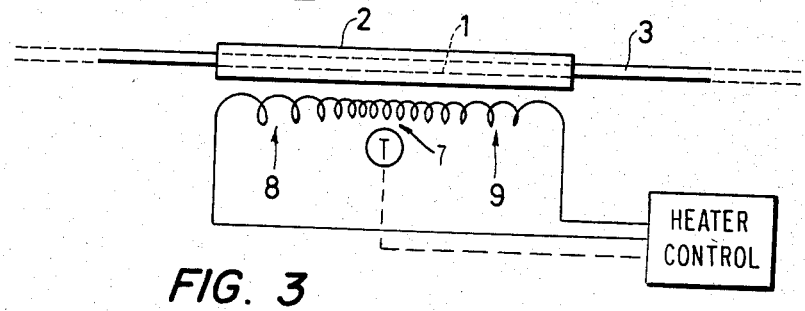
FIG. 2 is a side view illustrating the method of heating a thermal shrinkage tube according to an embodiment of the invention, when applied to the reinforcement of the junction portion between optical fibers, using a helical heating wire.

According to the present invention, on the contrary, as shown in FIG. 2, a single continuous heating wire which is made to be closely spaced at its central portion 7 and loosely spaced at each of its opposite end portions 8 and 9, respectively, is caused to extend along the object 2 to be heated similarly to the conventional case. Source energy is uniformly passed through this heating wire. The source energy is generally electric power and an electrical resistance heating conductor is used as the elongated heating wire. According to the method of the present invention, the central portion of the thermal shrinkage tube 2 in the vicinity of the optical fiber splice 1 portion is first heated to cause the tube to shrink so as to adhere closely to the optical fiber at that portion to thereby cause air bubbles to move toward the opposite end portions of the tube. Since the density of the heating wire is coarse or low at each of its opposite end portions 8 and 9, the temperature rise gradually progresses from the central portion to the opposite end portions to thereby successively purge air bubbles toward the opposite end portions so that the whole of the thermal shrinkage tube is made to completely closely adhere to the optical fibers, even if a single heating wire is used.

Figure 3:
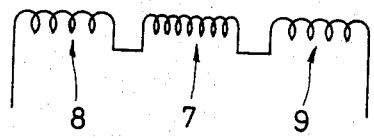
FIG. 3 is a diagram illustrating a modification of the heating wire of FIG. 2; and, FIGS. 4 and 5 are diagrams illustrating modifications of the heating wire of FIG. 2.

FIG. 3 illustrates another example of the shape of the heating wire, in which the heating wire has a central portion 7 at which the density is high or the number of turns is large and opposite end portion 8 and 9, each of which is separated from the central portion 7 by a certain distance and at which the density is low or the number of turns is small. Specifically, by way of mere example, the optical fiber splice protection portion may be about 60 mm in length, and the heating conductor may have about the same length as the protection portion, the central high density heating portion 7 being 20-30 mm in length and the opposite end low density heating portions 8 and 9 each being 5-10 mm in length and each being separated from the central heating portion through a 5-10 mm single wire portion.

Further, when a temperature adjusting thermistor was provided at the central winding portion and the surface temperature of the tube was adjusted to equal 160° C., a gradual temperature gradient was confirmed with the opposite end wide portions being at 130° C. In this case, using a thermal shrinkage tube of a transparent material, it was observed that close adhesion between the inner surface of the tube and the optical fiber began at the central portion of the tube and progressed from the central portion toward the opposite end portions so that air bubbles were purged at the opposite end portions of the tube. When the set temperature at the central portion was increased to 190° C., the temperature at each of the opposite portions increased to about 160° C., and it was confirmed that shrinkage, close adhesion and end-portion protection were efficiently performed.

The heating wire may be wound with a metal foil, such as German silver foil or the like so facilitate the shrinkage of the tube.

Figure 4:
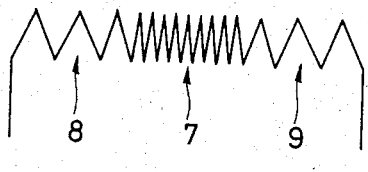
Figure 5:
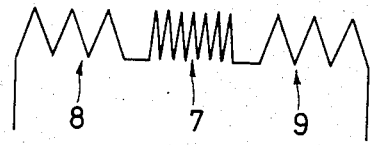

The heating wire may be formed in a bent or saw-tooth shape, as shown in FIG. 4 or FIG. 5. More generally, a heating method or apparatus in which a proper temperature gradient is formed by a heater at its central and opposite end portions falls within the scope of the present invention. The present invention is applicable not only to a method or apparatus for heating a thermal shrinkage tube for use in reinforcing the splice portion of optical fibers, but to all those for the general purpose of shrinking a thermal shrinkage tube.

What is claimed is:

1. A method of heating a thermal shrinkage tube, comprising the steps of successively increasing the temperature thereof beginning from a central portion of the tube and progressing to opposite ends of the tube to achieve a gradual temperature gradient from the central portion of said tube to said opposite ends, to thereby successively shrink said tube from the central portion thereof to the opposite sides thereof; using a single heater in which the heating density of said heater for heating the thermal shrinkable tube is varied longitudinally with respect to the tube; detecting a change in temperature of said heater and controlling the temperature of said heater in response to said detected change in temperature.

2. A method of heating a thermal shrinkage tube according to claim 1, in which the change in temperature of said heater is controlled, by being detected by a temperature detecting means, to thereby stepwise or gradually increase the temperature of said heater.

3. A method of heating a thermal shrinkage tube according to claim 1, wherein said thermal shrinkage tube covers a pair of optical fiber end portions with the splice portion therebetween placed at the central portion of the tube.

4. An apparatus for heating a thermal shrinkage tube, comprising; heating means including a heating wire formed into a non-linear shape, the heating density of said heating wire being varied longitudinally with respect to the thermal shrinkage tube such that said density is large at the central portion of the tube while said density is small at opposite ends of the same wherein a gradual temperature gradient is established from the central portion of the tube to said opposite ends.

5. An apparatus for heating a thermal shrinkage tube, comprising; a heater for heating the thermal shrinkage tube having a central portion and two end portions, said heater having a temperature distribution formed longitudinally with respect to the tube such that the temperature is high at said central portion relative to said end portions wherein said heater heats the entire thermal shrinkage tube simultaneously, establishing a temperature gradient from the central portion of said tube to said end portions and means for detecting the temperature of said heater and controlling said heater in response to said detected temperature.

6. An apparatus for heating a thermal shrinkage tube according to claim 5, said heater comprising a single wire resistance heating element whose ends and central portion generally positionally correspond to like portions of said tube.

7. An apparatus for heating a thermal shrinkage tube according to claim 6, said heating element comprising a winding having a higher density of turns at the central portion thereof.

8. An apparatus for heating a thermal shrinkage tube according to claim 6, said heating element comprising a generally saw-tooth shaped element having a smaller pitch at the central portion thereof.

9. An apparatus for heating a thermal shrinkage tube according to claim 7, said density of turns gradually increasing from said ends to said central portion of said element.

10. An apparatus for heating a thermal shrinkage tube according to claim 5, said pitch gradually decreasing from said ends to said central portion of said element.

* * * * *